US010755031B2

(12) United States Patent
Liu et al.

(10) Patent No.: US 10,755,031 B2
(45) Date of Patent: Aug. 25, 2020

(54) COGNITIVE GLYPH BUILDING

(71) Applicant: International Business Machines Corporation, Armonk, NY (US)

(72) Inventors: Su Liu, Austin, TX (US); Boyi Tzen, Taipei (TW); Fan Yang, Beijing (CN); Debbie Anglin, Williamson, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/135,200

(22) Filed: Sep. 19, 2018

(65) Prior Publication Data
US 2020/0089741 A1    Mar. 19, 2020

(51) Int. Cl.
*G06F 40/126* (2020.01)
*G06K 9/68* (2006.01)
*G06F 40/109* (2020.01)

(52) U.S. Cl.
CPC .......... *G06F 40/126* (2020.01); *G06F 40/109* (2020.01); *G06K 9/6828* (2013.01); *G06K 2209/01* (2013.01)

(58) Field of Classification Search
CPC ......... G06T 11/203; G06T 11/60; G09G 5/24; G06K 9/6828; G06K 2209/01; G06F 17/214; G06F 40/126; G06F 40/109; G06F 40/129
See application file for complete search history.

(56) References Cited

U.S. PATENT DOCUMENTS

| | | | | |
|---|---|---|---|---|
| 5,859,648 A | * | 1/1999 | Moore | G06F 17/214 345/471 |
| 5,990,907 A | * | 11/1999 | Colletti | G06F 17/214 345/467 |
| 7,937,658 B1 | * | 5/2011 | Lunde | G06F 17/214 715/256 |
| 9,063,682 B1 | * | 6/2015 | Bradshaw | G06F 3/1244 |
| 9,245,361 B2 | | 1/2016 | Linnerud et al. | |

(Continued)

FOREIGN PATENT DOCUMENTS

GB    2554126 A    3/2018

OTHER PUBLICATIONS

Borgo et al., "Glyph-based Visualization: Foundations, Design Guidelines, Techniques and Applications," Eurographics 2013/M. Sbert, L. Szirmay-Kalos, STAR—State of the Art Report, 25 pgs.

*Primary Examiner* — Chante E Harrison
(74) *Attorney, Agent, or Firm* — Cantor Colburn LLP; David Quinn

(57) ABSTRACT

Embodiments include methods, systems and computer program products method for generating one or more new glyphs by combining one or more available radicals. The computer-implemented method includes receiving, using a processor, a glyph determined to be unavailable for a character representation within text. The processor identifies one or more structures and radicals associated with the unavailable glyph for the character. The processor further searches for a replacement glyph or portions thereof from a group of available glyphs. The processor combines the replacement glyph or portions thereof to form a new glyph. The processor further replaces the unavailable glyph with the new glyph. The processor further displays the new glyph in the text at a location associated with the unavailable glyph.

17 Claims, 7 Drawing Sheets

(56) References Cited

U.S. PATENT DOCUMENTS

| | | | |
|---|---|---|---|
| 9,311,896 B2 | 4/2016 | Matskewich et al. | |
| 9,319,444 B2 * | 4/2016 | Levantovsky | H04N 21/235 |
| 9,465,776 B2 | 10/2016 | Furman et al. | |
| 9,881,395 B2 | 1/2018 | Wang et al. | |
| 2007/0006076 A1 * | 1/2007 | Cheng | G06F 17/214 |
| | | | 715/205 |
| 2008/0154911 A1 * | 6/2008 | Cheng | G06F 17/214 |
| 2011/0276872 A1 * | 11/2011 | Kataria | G06F 17/214 |
| | | | 715/234 |
| 2013/0027406 A1 * | 1/2013 | Liu | G06F 17/214 |
| | | | 345/467 |
| 2013/0120396 A1 | 5/2013 | Kaplan | |
| 2014/0047329 A1 * | 2/2014 | Levantovsky | G06F 16/9577 |
| | | | 715/269 |
| 2015/0074522 A1 * | 3/2015 | Harned, III | G06F 17/214 |
| | | | 715/269 |
| 2015/0186758 A1 * | 7/2015 | Kuroki | G06K 15/1802 |
| | | | 358/1.11 |
| 2015/0278167 A1 * | 10/2015 | Arnold | G06F 17/2211 |
| | | | 382/155 |
| 2017/0249286 A1 * | 8/2017 | Kaplan | G06F 40/109 |
| 2018/0082156 A1 * | 3/2018 | Jin | G06K 9/6828 |

* cited by examiner

COGNITIVE GLYPH BUILDING

BACKGROUND

The present invention relates in general to text display and more specifically, to creating new glyphs and fonts for display in real time.

Computer systems present textual information to end users via a font, which is an electronic data file containing a set of glyphs. Each glyph is a visual representation of a character of a font where the visual representations of a font have a common style of typeface. As the number of characters defined in a font increases, a greater number of glyphs are needed to present the characters of the font. For example, a basic font to support the English language has a glyph for each capital and a small letter of the alphabet. A more complex font will include a glyph for each desired punctuation or another symbol of interest to an end user.

SUMMARY

Embodiments of the invention are directed to a method for generating one or more new glyphs by combining one or more available radicals. A non-limiting example of the computer-implemented method includes receiving, using a processor, a glyph determined to be unavailable for a character representation within the text. The processor identifies one or more structures and radicals associated with the unavailable glyph for the character. The processor further searches for a replacement glyph or portions thereof from a group of available glyphs. The processor combines the replacement glyph or portions thereof to form a new glyph. The processor further replaces the unavailable glyph with the new glyph. The processor further displays the new glyph in the text at a location associated with the unavailable glyph.

Embodiments of the invention are directed to a computer program product that can include a storage medium readable by a processing circuit that can store instructions for execution by the processing circuit for performing a method for generating one or more new glyphs by combining one or more available radicals. The method includes receiving a glyph determined to be unavailable for a character representation within the text. The processor identifies one or more structures and radicals associated with the unavailable glyph for the character. The processor further searches for a replacement glyph or portions thereof from a group of available glyphs. The processor combines the replacement glyph or portions thereof to form a new glyph. The processor further replaces the unavailable glyph with the new glyph. The processor further displays the new glyph in the text at a location associated with the unavailable glyph.

Embodiments of the invention are directed to a system including a plurality of computing devices. The system can include a processor in communication with one or more types of memory. The processor can be configured to receive a glyph determined to be unavailable for a character representation within the text. The processor can be configured to identify one or more structures and radicals associated with the unavailable glyph for the character. The processor can be configured to search for a replacement glyph or portions thereof from a group of available glyphs. The processor can be configured to combine the replacement glyph or portions thereof to form a new glyph. The processor can be configured to replace the unavailable glyph with the new glyph. The processor can be configured to display the new glyph in the text at a location associated with the unavailable glyph.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The foregoing and other features, and advantages of the disclosure are apparent from the following detailed description taken in conjunction with the accompanying drawings in which.

Figure 1:
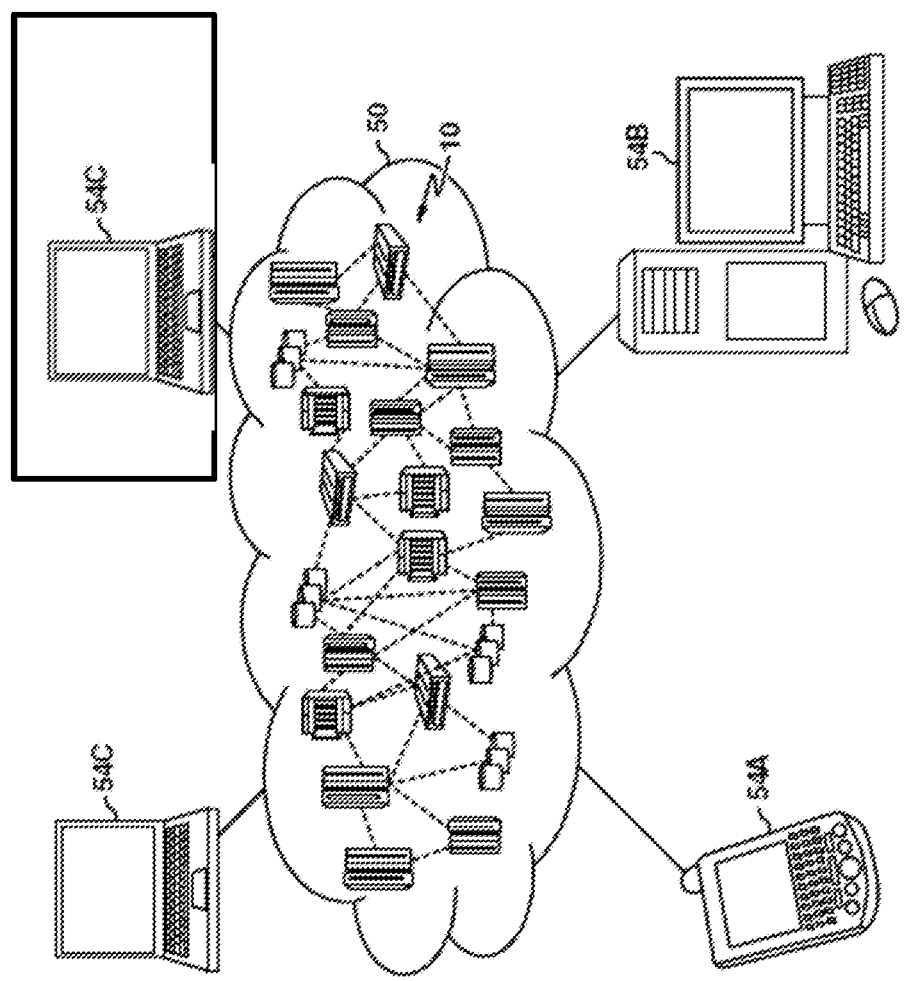
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to presenting text as characters. The availability of glyphs for characters defined in a code set of one or more fonts directly impacts if the text can be properly presented to an end user with a visual representation. The more characters available in a code set of a computer system, the more glyphs are needed by the computer system to present the characters. When the correct character or portions thereof are unavailable, a computer system can utilize font substitution, which attempts to replace a character for a font that either is not available or does not contain a glyph with a glyph of another font that has the character. Font substitution can be problematic because if no glyph has been defined for a newly created character, no substitution is available and the character cannot be displayed. Moreover, there are instances where a glyph has been defined for a new character, but the substitution is not suitable (i.e., not an exact or close match), the character will be displayed but will be noticeably different from the other characters that are displayed. For example, in a cloud environment, a file created from a first user's system may be difficult to be displayed on a second user's system due to the lack of glyphs in the font for newly created characters in the file.

Unicode is a standardized super code set, which provides fonts for hundreds of languages and includes over 100,000 graphic symbols. The number of characters included in Unicode continues to increase as new characters are continuously defined in different languages, for example, Asian languages such as Chinese, Japanese, and Korean (CJK). As characters are added to Unicode, font vendors update fonts to add new glyphs and end users purchase updated fonts in order to present characters at their computer systems correctly, which is expensive and time-consuming.

Turning now to an overview of the aspects of the invention, one or more embodiments of the invention address the above-described shortcomings of the prior art by identifying radicals associated with missing glyphs and extracting the radicals or suitably similar radicals from existing glyphs which can be used to generate a new glyph. Accordingly, text, file/directory names and network nodes having new or missing portions of a glyph can be displayed by combining existing portions of the glyph with suitable substitutes for new or missing portions of the glyph and the enhanced glyph can be stored for future use.

The above-described aspects of the invention address the shortcomings of the prior art by identifying missing radicals for glyphs and generating new glyphs or fonts from existing glyphs, which can be used in place of the missing radicals. Accordingly, the system can compensate for new glyphs or fonts in real-time thereby saving costs and time associated with the prior art.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
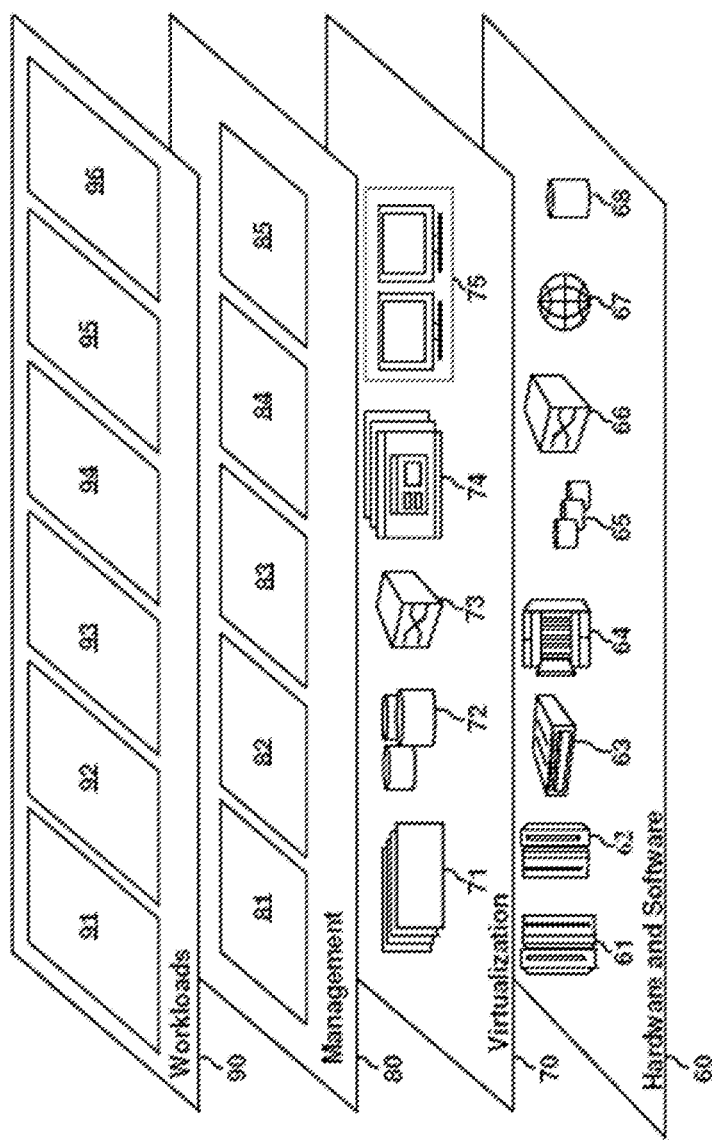
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and font management 96.

Figure 3:
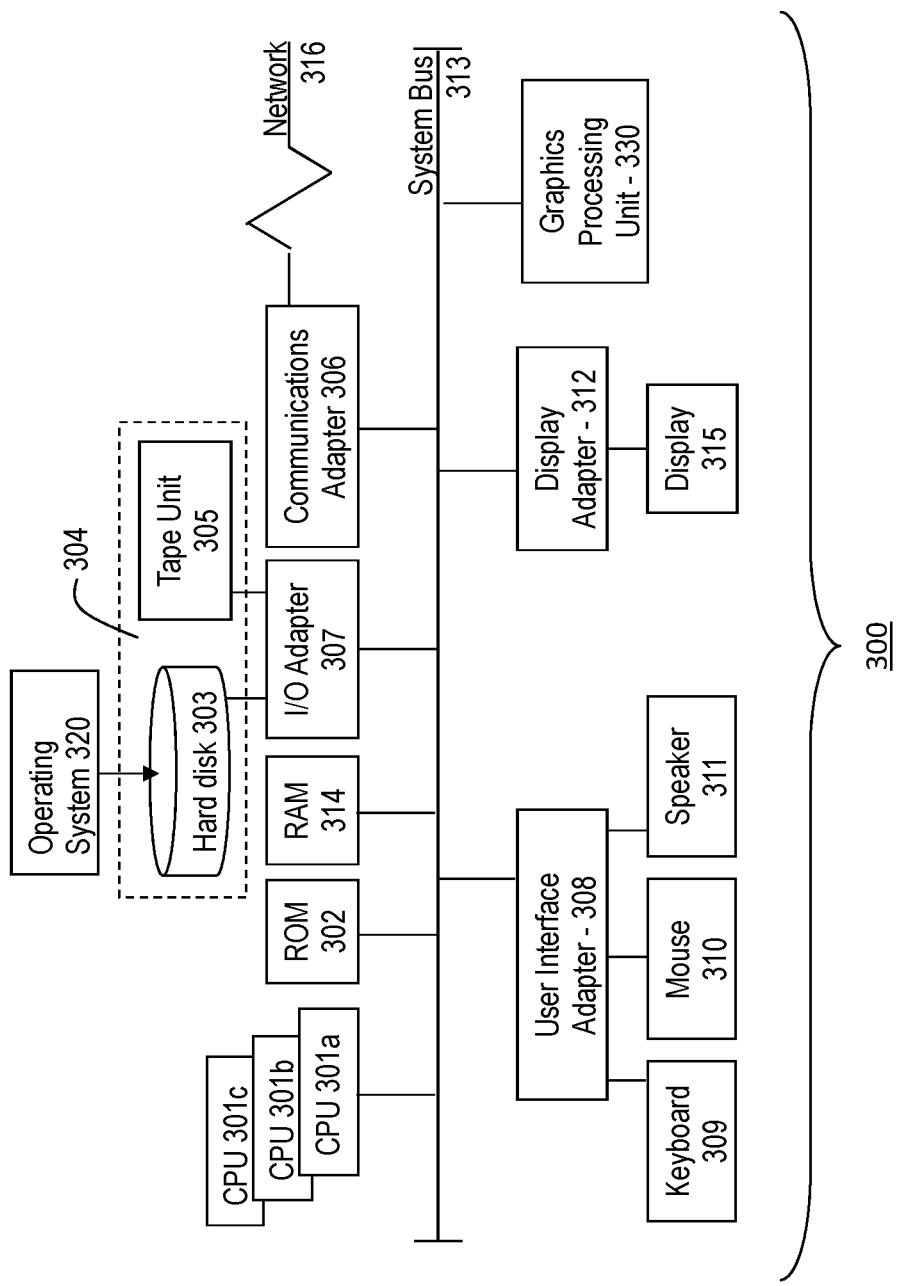
FIG. 3 is a block diagram illustrating one example of a processing system for practice of the teachings herein.

Referring to FIG. 3, there is shown a processing system 300 for implementing the teachings of the present disclosure according to one or more embodiments of the invention described herein. The system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a communications adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A communications adapter 306 interconnects bus 313 with an outside network 316 enabling data processing system 300 to communicate with other such systems. A screen (e.g., a display monitor) 315 is connected to system bus 313 by display adapter 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnect to bus 313 via user interface adapter 308, which may include, for example, a Super I/O chip integrating multiple device adapters into a single integrated circuit.

In exemplary embodiments of the invention, the processing system 300 includes a graphics-processing unit 330. Graphics processing unit 330 is a specialized electronic circuit designed to manipulate and alter memory to accelerate the creation of images in a frame buffer intended for output to a display. In general, graphics-processing unit 330 is very efficient at manipulating computer graphics and image processing, and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

Figure 4:
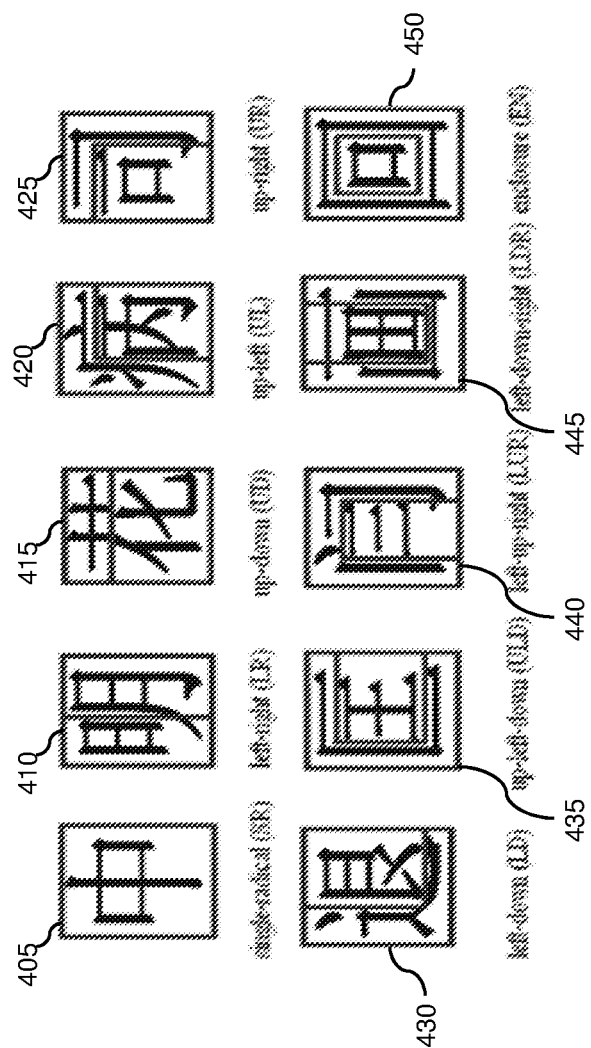
FIG. 4 is a block diagram illustrating structure types associated with characters used in an ideographic language (such as Chinese, Japanese and Korean (CJK) languages) according to one or more embodiments of the present invention.

Referring now to FIG. 4, there is illustrated structure types (also known as Ideographic Description Sequences, or IDSes) associated with characters used in an ideographic language (such as Chinese, Japanese and Korean (CJK) languages) in accordance with one or more embodiments of the invention. IDSes can be used in describing characters not included in a standard in terms of combinations of components that have code points. The CJK languages use radicals, which are a graphical component of a CJK character under which the character is traditionally listed in a CJK dictionary. CJK characters can be associated with one of 10 structure types (single-radical 405, left-right 410, up-down 415, up-left 420, up-right 425, left-down 430, up-left-down 435, left-up-right 440, left-down-right 445 and enclosure 450). Multiple radicals can be used to form the CJK characters. The structure of the character can be considered when determining how to address missing glyphs within the character.

Figure 5:
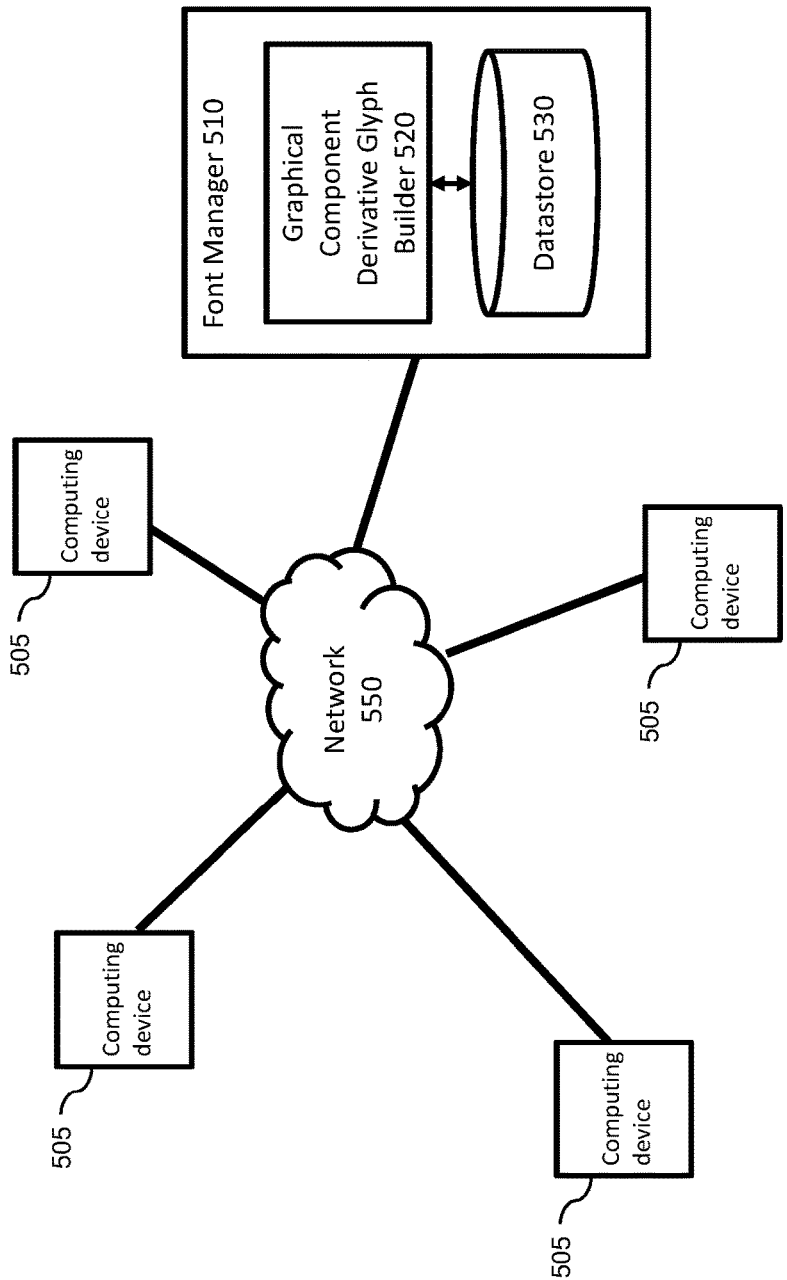
FIG. 5 illustrates a computing system according to one or more embodiments of the present invention.

Referring now to FIG. 5, there is illustrated a computing system 500 in accordance with one or more embodiments of the invention. As illustrated, the computing system 500 can include but is not limited to, a plurality of computing devices 505 and a font manager 510 connected over one or more networks, for example, network 550. The font manager 510 can include a graphical component derivative glyph builder (GCDGB) 520 and a datastore 530.

In some embodiments of the invention, the computing devices 505 can be, for example, personal digital assistant (PDA) or cellular telephone 54A, desktop computer 54B, laptop computer 54C, and/or automobile computer system 54N). Each of the plurality of computing devices 505 can communicate with each other via network 550. Accordingly, the computing devices 505 can exchange texts, files, documents, etc. (electronic documents) for display and/or use.

The network(s) 550 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 550 can have any suitable communication range associated therewith and can include, for example, global networks (e.g., the Internet), metropolitan area networks (MANs), wide area networks (WANs), local area networks (LANs), or personal area networks (PANs). In addition, the network(s) 550 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Because characters are constantly being added to Unicode, each of the plurality of computing devices 505 may be using a different version or variation of the same version of Unicode. Accordingly, problems can arise when exchanging electronic documents between computing devices 505 (e.g., no character being displayed within the electronic document or the character being used to noticeably different in comparison to other characters displayed within the electronic document).

In some embodiments, the font manager 510 can operate on a server or one or more cloud computing nodes. The font manager 510 can receive and/or monitor electronic documents exchanged between computing devices 505. The font manager 510 can determine whether a receiving computing device 505 supports fonts associated with the electronic document. If the computing device 505 does not have fonts that are associated with the electronic document, the font manager 510 can instruct the GCDGB 520 to create new glyphs and fonts in real time using supported portions of the electronic document and available radicals (stored) which can be combined to form a new glyph. The new glyph can be rendered and displayed within the electronic document at a location within the electronic document associated with the unsupported font.

The datastore 530 can store a font repository, a radical table, and/or a component table. The GCDGB 520 can use information associated with any of the font repository, a radical table, and/or a component table to create new glyphs and fonts. The datastore 530 can also store newly created glyphs and fonts.

Figure 6:
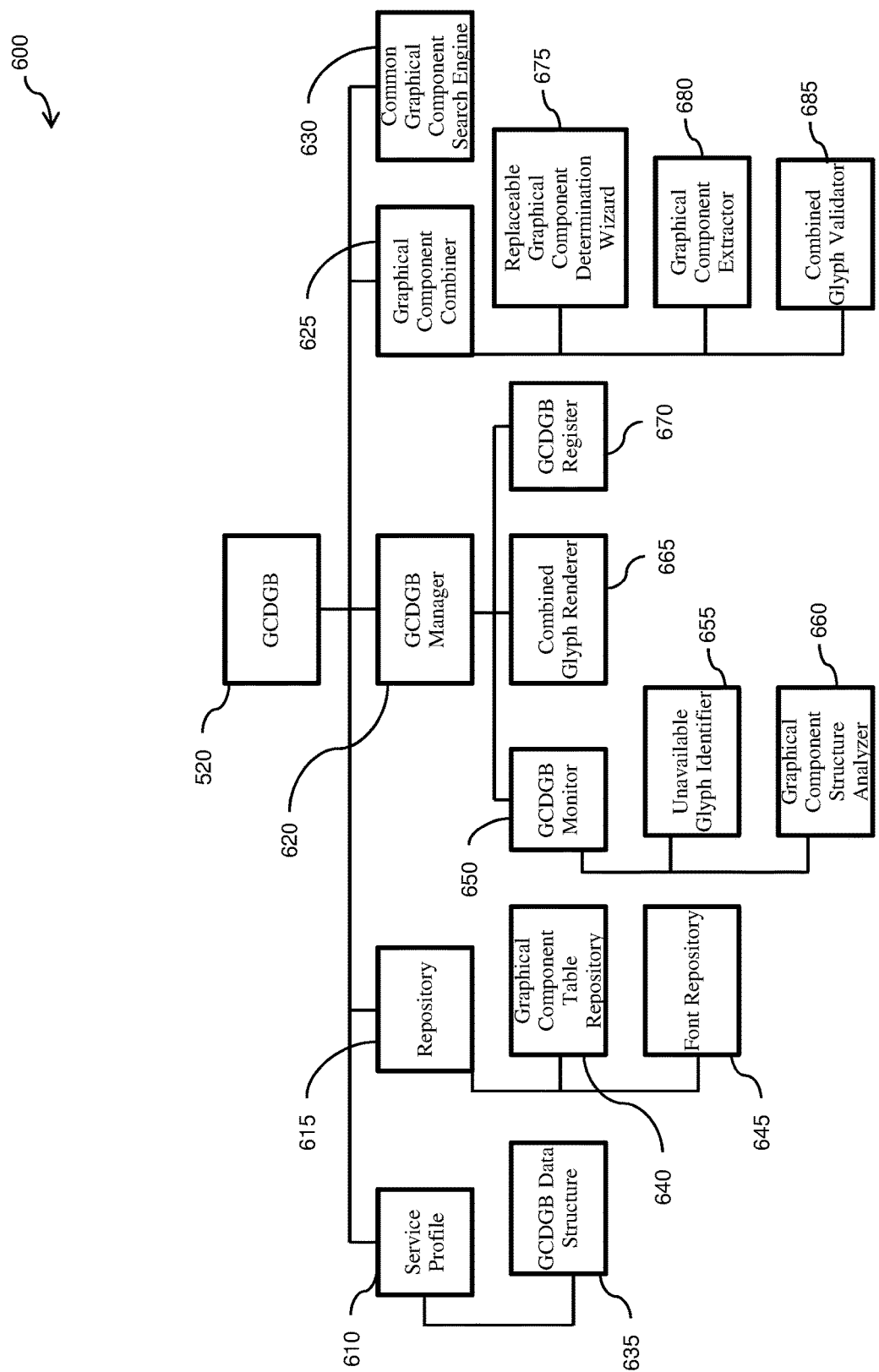
FIG. 6 illustrates an exemplary set of components according to one or more embodiments of the present invention.

FIG. 6 is an exemplary set of components 600 for the GCDGB 520 and datastore 530 in accordance with one or more embodiments of the present invention. The set of components 600 can include a Service Profile 610, which can be a file (plain text or XML) for configuring a GCDGB service. For instance, the Service Profile 610 can include available fonts, font, and glyph substitution rules, a glyph validation method(s), a glyph validation threshold(s), port numbers associated with a Common Graphical Component Search Engine, etc. The Service Profile 610 can include an associated GCDGB Data Structure 635. The GCDGB Data Structure 635 can be a data structure used for learning and maintaining radical relationships. The GCDGB Data Structure 635 can have the following format: GCDGB_Data [FontID, Char_Index, Radical_Strucutre_Type, Graphical_Component_List].

A successfully returned GCDGB_DATA may include at least the following exemplary information:

GCDGB_DATA[

*FontID* [WT_Sans_SC_EA],

Char_Index [0×2*ECF*8],

Radical_Strucutre_Type [left-right]

(Graphical_Component_List[left] = Right[0×79*CD*]) –>

(Graphical_Component_List[right] = Right[0×66*A*2])

]

The set of components 600 can also include a repository 615, which can include a graphical component table repository 640 and a font repository 645. The graphical component table repository 640 can be used to save and maintain common graphical component relationships. The font repository 645 can be used to save and maintain supported fonts. Newly created glyphs can be uploaded and associated with correlated fonts. For example, a newly created glyph [0x2ECF8] can be added into WT_Sans_SC_EA, if the derived components were extracted from FontID [WT_Sans_SC_EA]. The set of components 600 can also include a GCDGB manager 620. The GCDGB manager 620 can be a module for managing updated fonts and new added glyphs according to configuration settings defined in the service profile 610. The GCDGB manager 620 can include a GCDGB monitor 650. The GCDGB monitor 650 can be a module for a monitoring glyph rendering operation in a given font (e.g. WT_Sans_SC_EA) for a given application. The GCDGB monitor 650 can determine which font is loaded and which glyph is used in a running application.

The GCDGB monitor 650 can include an unavailable glyph builder 655. The unavailable glyph builder 655 can be a module for identifying an unavailable glyph in the current font. The unavailable glyph builder 655 can identify and determine whether a glyph is not available in a given font. For example, the unavailable glyph builder 655 can detect that the glyph [0x2ECF8] is not available in FontID [WT_Sans_SC_EA].

The GCDGB monitor 650 can also include a graphical component structure analyzer 660. The graphical component structure analyzer 660 can include a module for analyzing a graphical component structure of the unavailable glyph. For example, the following types of character structures can be returned after analysis: left-right, up-down, up-left, up-right, left-down, up-left-down, left-up-right, left-down-right and enclosure etc. The graphical component structure analyzer 660 can include an image recognition or artificial intelligence (AI) based graphical component which can be used to analyze a given character image (e.g. defined in Unicode Consortium). For example, an image of the character Char_Index[0x2ECF8], can be recognized as a left-right structure.

The GCDGB manager 620 can also include a combined glyph renderer 665. The combined glyph renderer 665 can be a module for rendering validated combined radicals as a new glyph in the application. The GCDGB manager 620 can also include a GCDGB register 670. The GCDGB register 670 can be a module for registering a new font with the font repository 645.

The GCDGB 520 can also include a graphical component combiner 625. The graphical component combiner 625 can be a module for combining available radicals into a new glyph. For example, the graphical component combiner 625 can combine a new glyph according to input associated with a graphical component list (e.g., (Graphical_Component_List[left]=Right[0x79CD])→(Graphical_Component_List[right]=Right[0x66A2])).

The graphical component combiner 625 can include a replaceable graphical component determination wizard 675. The replaceable graphical component determination wizard 675 can be a module for determining suitable and replaceable graphical components in an unavailable glyph. For example, the replaceable graphical component determination wizard 675 can determine whether a glyph of Char_Index[0x2ECF8] can be built by available components, such as Right[0x79CD]), Right[0x66A2]. The graphical component combiner 625 can also include a graphical component extractor 680. The graphical component extractor 680 can be a module for extracting a searched graphical component(s) (e.g., left-right (left or right), up-down (up or down), up-left, up-right, left-down, up-left-down, left-up-right, left-down-right and enclosure). For example, the graphical component extractor 680 can receive an input (e.g., Char_Index [0x2ECF8]), and can return exemplary graphical components: Graphical_Component_List[left]=Right[0x79CD] and Graphical_Component_List[right]=Right[0x66A2].

The graphical component combiner 625 can also include a combined glyph validator 685. The combined glyph validator 685 can be a module for validating newly combined radicals in an application according to predefined glyph criteria. For example, the predefined glyph criteria state that a character width shall not be wider than the maximum width of a standard glyph or in comparison to a given template glyph, a difference in width and/or height for the newly created glyph should not be greater than 10%.

The GCDGB 520 can also include a common graphical component search engine 630. The common graphical component search engine 630 can be a module for searching for an available glyph using common replaceable graphical components. For example, an input can include a type of character (e.g. "left-right") and character ID (e.g., Char_Index[0x2ECF8]), and an output can be a set of derived character components, such as "Right[0x79CD]), Right [0x66A2]". The common graphical component search engine 630 can be a local API or SaaS service. The common graphical component search engine 630 may also include multiple sets of derived character components for use by the replaceable graphical component determination wizard 675 to find the most suitable derived character components. Suitability can be based on a variety of factors or combinations thereof, including: a font style analysis (e.g. based on a difference in width and/or height to fonts being presented), an aesthetic evaluation (i.e., the rule-of-thirds, object centering, and the golden ratio), a height analysis, a weight analysis and/or use feedback analysis.

Figure 7:
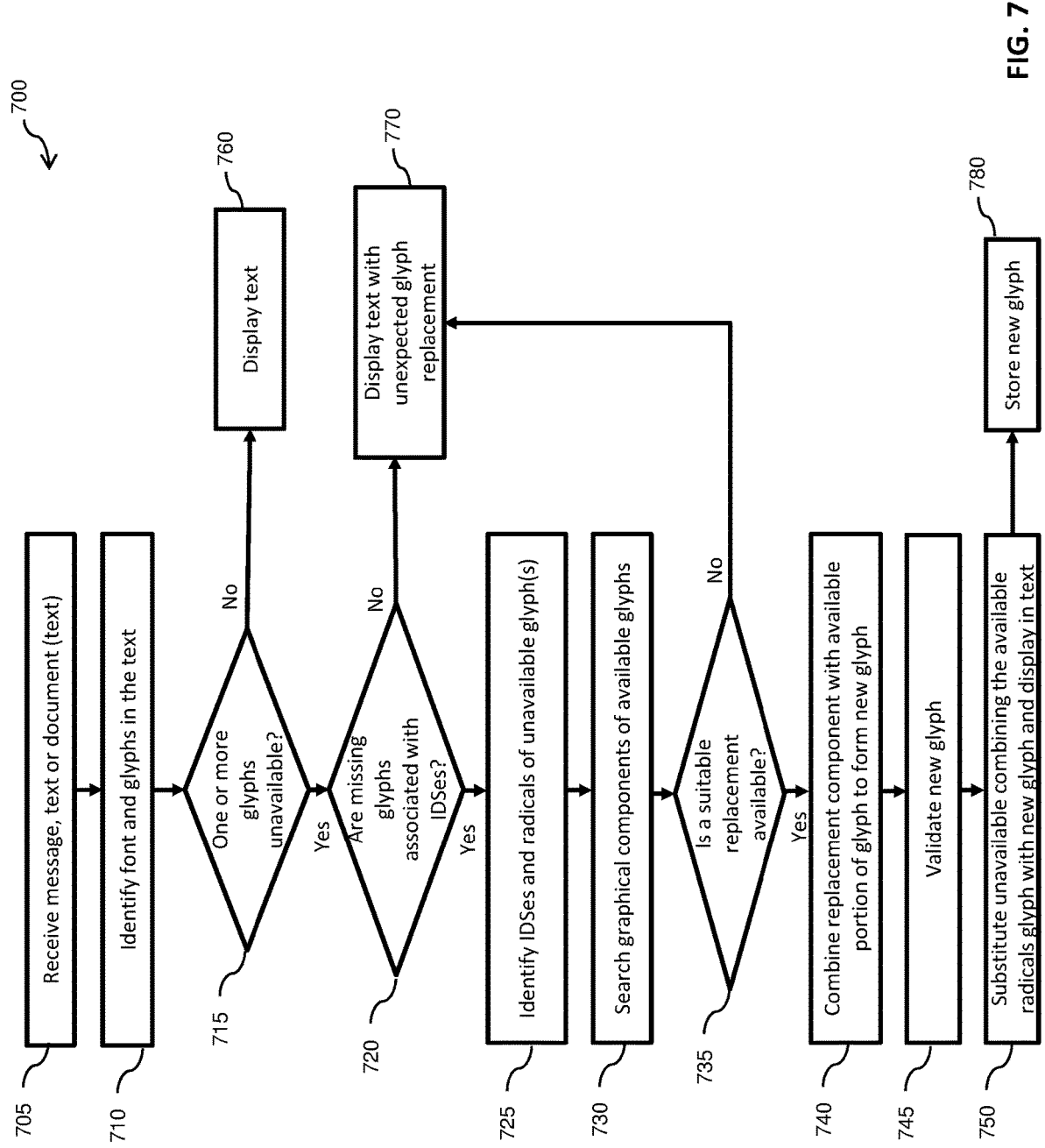
FIG. 7 is a flow diagram of a method for generating one or more new glyphs by combining one or more available radicals according to one or more embodiments of the present invention.

Now referring to FIG. 7, a flow diagram of a method 700 for generating one or more new glyphs by combining one or more available radicals in accordance with one or more embodiments of the present invention is illustrated. At block 705, a computing device, for example, computing device 505, can receive a message, text, document or any other data utilizing fonts and glyphs (text). At block 710, the computing device can identify fonts and glyphs associated with the text.

At block 715, the computing device can determine whether one or more glyphs within the text are unavailable (i.e., cannot be rendered). If all the glyphs with the text are available, the method 700 proceeds to block 760, where the text is displayed. If one or more glyphs within the text are unavailable, the method 700 proceeds to block 720, where the computing device can determine whether one or more unavailable glyphs is associated with Ideographic Description Sequences" (IDSes) (e.g., CJK characters. If the one or more unavailable glyphs are not associated with IDSes, the method 700 proceeds to block 770 where an unexpected glyph replacement method can be employed to substitute the one or more unavailable glyphs with a glyph(s) of another font.

If the one or more unavailable glyphs associated with IDSes, the method 700 proceeds to block 725 where the computing device can communicate with a remote/cloud server, which can include a graphical component derivative glyph builder, to identify a structure associated with each character of the one or more unavailable glyphs. At block 730, the remote/cloud server, which can store a font repository, a radical table, and/or a component table, can be searched to determine available glyphs or portions thereof that can be used to build a glyph. At decision block 735, the remote/cloud server can determine whether a suitable replacement has been found within the available glyphs or portions thereof. If a suitable replacement has not been found, the method 700 returns to block 770.

If a suitable replacement has been found, the method 700 proceeds to block 740 where the remote/cloud server can combine the suitable replacement with other components of the text to form a new glyph. At block 745, the remote/cloud server can validate the new glyph according to a predefined glyph criteria. At block 750, the remote/cloud server can substitute the new glyph in place of the one or more unavailable glyphs. Accordingly, the remote/cloud server can display the new glyph within the text at the location of an associated unavailable glyph. At block 780, the remote/cloud server can store the new glyph for future use.

Accordingly, a system, a method, and/or computer program product disclosed herein can identify and extract radicals from existing glyphs and then combine them into a new glyph, which can be used as substitutes for unavailable glyphs when rendering text and files. The system can also, define a radical derivative data structure for learning and maintaining a radical relationship, maintain a common radical table, dynamically, monitor a glyph rendering operation for a given font of a given application, identify an unavailable glyph in a font, analyze a graphical component structure of the unavailable glyph, determine replaceable graphical components in the unavailable glyph, search available glyphs having common replaceable graphical components, extract the searched graphical component(s) (e.g., (left-right (left or right), up-down (up or down), up-left, up-right, left-down, up-left-down, left-up-right, left-down-right and enclosure), combine the available radicals into a new glyph, validate the new combined radicals in the application, render the validated combined radicals as a new glyph in the application, add the new glyph into the font recursively and register the new font to a font repository.

Advantages provided by system can include an ability to render unavailable glyphs on the fly, automatically add new glyphs from a unique augmented expression sticker, provide real-time font updates, savings in font cost for new fonts when glyphs are unavailable and improving a user experience by providing replacement glyphs more closely related to a font associated with an unavailable glyph.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating one or more new glyphs by combining one or more available radicals, the method comprising:
    monitoring, by a processor of a remote server, electronic documents exchanged between a sending computing device and a receiving computing device;
    determining, by the processor, that the receiving computing device does not support fonts associated with an electronic document sent to the receiving computing by the sending computer, wherein determining that the receiving computing device does not support fonts associated with the electronic document comprises determining that the electronic document includes a glyph determined to be unavailable for a character representation within text;
    identifying, using the processor, one or more structures and radicals associated with the unavailable glyph for the character based on an analysis of a graphical component structure associated with the unavailable glyph, wherein the analysis of the graphical component structure associated with the unavailable glyph returns a character structure associated with the unavailable glyph that comprises at least one of a left-right structure, an up-down structure, an up-left structure, an up-right structure, a left-down structure, an up-left-down structure, a left-up-right structure, a left-down-right structure and an enclosure structure;
    searching, using the processor, for replacement radicals from a group of available glyphs;
    combining, using the processor, the replacement radicals to form a new glyph based on the character structure associated with the unavailable glyph;
    replacing, using the processor, the unavailable glyph with the new glyph; and
    displaying, using the processor, the new glyph in the text at a location associated with the unavailable glyph.

2. The computer-implemented method of claim 1, wherein the unavailable glyph includes one or more characters associated with Ideographic Description Sequences.

3. The computer-implemented method of claim 1, further comprising validating the new glyph.

4. The computer-implemented method of claim 3, wherein the validation of the new glyph is based on a predefined glyph criteria.

5. The computer-implemented method of claim 1, further comprising storing the new glyph.

6. The computer-implemented method of claim 1, further comprising adding the new glyph into a font recursively.

7. A computer program product, the computer program product comprising a computer readable storage medium having program instructions embodied therewith, the program instructions readable by a processor of a remote server to cause the processor to:

monitor electronic documents exchanged between a sending computing device and a receiving computing device;
determine that the receiving computing device does not support fonts associated with an electronic document sent to the receiving computing by the sending computer, wherein determining that the receiving computing device does not support fonts associated with the electronic document comprises determining that the electronic document includes a glyph determined to be unavailable for a character representation within text;
identify one or more structures and radicals associated with the unavailable glyph for the character based on an analysis of a graphical component structure associated with the unavailable glyph, wherein the analysis of the graphical component structure associated with the unavailable glyph returns a character structure associated with the unavailable glyph that comprises at least one of a left-right structure, an up-down structure, an up-left structure, an up-right structure, a left-down structure, an up-left-down structure, a left-up-right structure, a left-down-right structure and an enclosure structure;
search for replacement radicals from a group of available glyphs;
combine the replacement radicals to form a new glyph based on the character structure associated with the unavailable glyph;
replace the unavailable glyph with the new glyph; and
display the new glyph in the text at a location associated with the unavailable glyph.

8. The computer program product of claim 7, wherein the unavailable glyph includes one or more characters associated with Ideographic Description Sequences.

9. The computer program product of claim 7, further comprising validating the new glyph.

10. The computer program product of claim 9, wherein the validation of the new glyph is based on a predefined glyph criteria.

11. The computer program product of claim 7, further comprising storing the new glyph.

12. The computer program product of claim 7, further comprising adding the new glyph into a font recursively.

13. A computer system, comprising:
a processor in communication with one or more types of memory, the processor configured to:
monitor electronic documents exchanged between a sending computing device and a receiving computing device;
determine that the receiving computing device does not support fonts associated with an electronic document sent to the receiving computing by the sending computer, wherein determining that the receiving computing device does not support fonts associated with the electronic document comprises determining that the electronic document includes a glyph determined to be unavailable for a character representation within text;
identify one or more structures and radicals associated with the unavailable glyph for the character based on an analysis of a graphical component structure associated with the unavailable glyph, wherein the analysis of the graphical component structure associated with the unavailable glyph returns a character structure associated with the unavailable glyph that comprises at least one of a left-right structure, an up-down structure, an up-left structure, an up-right structure, a left-down structure, an up-left-down structure, a left-up-right structure, a left-down-right structure and an enclosure structure;
search for replacement radicals from a group of available glyphs;
combine the replacement radicals to form a new glyph based on the character structure associated with the unavailable glyph;
replace the unavailable glyph with the new glyph; and
display the new glyph in the text at a location associated with the unavailable glyph.

14. The computer system of claim 13, wherein the unavailable glyph includes one or more characters associated with Ideographic Description Sequences.

15. The computer system of claim 13, wherein the processor is further operable to validating the new glyph.

16. The computer system of claim 15, wherein the validation of the new glyph is based on a predefined glyph criteria.

17. The computer system of claim 13, wherein the processor is further operable to storing the new glyph.

* * * * *